(12) United States Patent
Kata

(10) Patent No.: US 7,056,109 B2
(45) Date of Patent: Jun. 6, 2006

(54) TIRE VULCANIZING DEVICE

(75) Inventor: Takehiro Kata, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/504,471

(22) PCT Filed: Feb. 14, 2003

(86) PCT No.: PCT/JP03/01585

§ 371 (c)(1),
(2), (4) Date: Aug. 12, 2004

(87) PCT Pub. No.: WO03/068473

PCT Pub. Date: Aug. 21, 2003

(65) Prior Publication Data
US 2005/0112222 A1    May 26, 2005

(30) Foreign Application Priority Data
Feb. 15, 2002    (JP)    ............................. 2002-038526

(51) Int. Cl.
*B29C 35/02*    (2006.01)
(52) U.S. Cl. ...................................................... 425/46
(58) Field of Classification Search ............... 425/28.1, 425/35, 46
See application file for complete search history.

(56) References Cited

U.S. PATENT DOCUMENTS

| | | | |
|---|---|---|---|
| 3,337,918 A | 8/1967 | Pacciarini et al. | |
| 3,730,658 A * | 5/1973 | Marra | 425/46 |
| 3,741,696 A * | 6/1973 | Greenwood | 425/46 |
| 3,922,122 A | 11/1975 | Bottasso et al. | |
| 4,013,390 A | 3/1977 | Moeller et al. | |
| 4,289,463 A * | 9/1981 | Le Moullac | 425/46 |
| 4,595,553 A | 6/1986 | Blayne et al. | |
| 4,743,322 A * | 5/1988 | Holroyd et al. | 425/47 |
| 4,957,676 A * | 9/1990 | Greenwood | 264/102 |
| 5,145,688 A | 9/1992 | Ohtake | |
| 5,165,939 A * | 11/1992 | Pizzorno | 425/47 |
| 5,585,064 A | 12/1996 | Moris-Herbeuval et al. | |
| 6,318,985 B1 * | 11/2001 | Heindel et al. | 425/46 |

FOREIGN PATENT DOCUMENTS

| | | |
|---|---|---|
| DE | 1 160 606 | 1/1964 |
| DE | 2 000 796 | 7/1971 |
| EP | 0 701 894 A2 | 3/1996 |
| FR | 1 440 604 | 6/1966 |
| GB | 1 417 008 | 12/1975 |
| GB | 1 418 175 | 12/1975 |
| JP | A 2-265712 | 10/1990 |
| JP | A 7-112440 | 5/1995 |
| JP | A 8-309755 | 11/1996 |

(Continued)

*Primary Examiner*—James P. Mackey
(74) *Attorney, Agent, or Firm*—Oliff & Berridge, PLC

(57) ABSTRACT

A tire vulcanizing device includes an upper plate and a lower plate which can be relatively displaced toward and away from each other, and a mold for vulcanizing and molding a tire arranged between the upper plate and the lower plate. The mold includes an upper and a lower side mold members arranged on the upper plate side and the lower plate side, respectively, and a plurality of sector mold members arranged between the upper and the lower side mold members. An outer ring for positioning the sector mold members in the radial direction is arranged on the lower plate side. An actuator for opening the sector mold member is arranged on the lower plate, capable of vertical elevation.

9 Claims, 3 Drawing Sheets

FOREIGN PATENT DOCUMENTS

| | | |
|---|---|---|
| JP | A 10-44156 | 2/1998 |
| JP | A 10-67527 | 3/1998 |
| JP | A 2000-84936 | 3/2000 |
| WO | WO 03/061952 A1 | 7/2003 |

* cited by examiner

TIRE VULCANIZING DEVICE

BACKGROUND ART

1. Field of the Invention

The present invention relates to a tire vulcanizing device wherein a vulcanizing mold cavity is defined by upper and lower side mold members and a plurality of sector mold members for molding a tread portion of a tire, and air trapped in the cavity, or gas or the like generated therein, can be sucked and removed in a state wherein an outer ring for causing displacement of the sector mold members and guiding such displacement is arranged on a lower plate.

2. Prior Art

A tire vulcanizing device which does not require formation of vent holes or the like in a mold member and prevents generation of protrusion of spews or the like in a product tire by sealing the vulcanizing molding cavity in air-tight manner and sucking and removing air trapped in the cavity or gas or the like generated in the cavity is disclosed, for example, in U.S. Pat. No. 4,595,553, Japanese Patent Application Laid-open Publication JP 02-265712A, U.S. Pat. No. 5,585,064, Japanese Patent Application Laid-open Publication JP 08-309755A, and Japanese Patent Application Laid-open Publication JP 10-67527A.

However, in the known tire vulcanizing devices disclosed in these documents, an outer ring for causing displacement or the like of the sector mold members is arranged on the side of an upper plate. Thus, in opening/closing operation of the vulcanizing device, it is necessary to vertically displace the outer ring, which is a heavy item. As a result, the structure of a vulcanizing machine is complicated by an operation mechanism or the like for the outer ring, thereby giving rise to a problem that the vulcanizing machine itself becomes large sized.

DISCLOSURE OF THE INVENTION

It is an object of the present invention to eliminate such a problem of the prior art and, in particular, to provide a tire vulcanizing device which allows simplification of the structure of a vulcanizing machine and reduction in size of the vulcanizing machine itself, by making it unnecessary to vertically operate a heavy outer ring.

According to the present invention, there is provided a tire vulcanizing device comprising an upper plate and a lower plate which can be relatively displaced toward and away from each other, and a mold for vulcanizing and molding a tire, arranged between the upper plate and the lower plate, said mold comprising an upper and a lower side mold members arranged on the upper plate side and the lower plate side, respectively, and a plurality of sector mold members arranged between the upper and the lower side mold members, wherein an outer ring for positioning the sector mold members in the radial direction is arranged on the lower plate side, and an actuator means for opening the sector mold member is arranged on the lower plate, so as to be displaceable vertically.

With the above structure of the vulcanizing device according to the present invention, when the mold is to be closed from the opened state, the upper plate is lowered and displaced by the actuator means toward the sector mold members and the lower side mold member in a lifted attitude relative to the lower plate. As a result, the sector mold members are lowered by the upper plate integrally with the actuator means directly or indirectly and displaced radially inwards (i.e., in the diameter reducing direction) under the action of a cam surface of the outer ring arranged on the lower plate side. Furthermore, by continuing such displacement of the sector mold members until the upper plate reaches the lowered limit position and the sector mold members reach the diameter reducing limit position, the vulcanizing device is fully closed and a vulcanization mold cavity can be defined between each of the mold members as desired.

In this way, according to the present invention, in the opening/closing operation of the vulcanizing device, it is unnecessary to operate the outer ring, which is a heavy item, or to provide a driving mechanism with complex structure, which had been considered unavoidable. It is thus possible to simplify the structure of the vulcanizing machine for controlling the operation of the vulcanizing device, hence, to realize a small-sized vulcanizing machine that is capable of achieving energy savings.

It is preferred that the actuator means is arranged so as to be displaceable upward from the lower plate, the lower side mold member is supported on the actuator means, and the sector mold members are supported on the actuator means before they are opened.

It is preferred that the tire vulcanizing device according to the present invention is provided with a seal means for substantially completely sealing a cavity defined by the upper and lower side mold members and sector mold members in air-tight manner, in the closed state of the mold. In this case, the inner space of the cavity defined in the closed state of the mold can be used as a substantially air-tight space. Thus, by actively sucking and removing trapped air or generated gas or the like within the cavity upon vulcanization of green tires, vulcanization can be performed while securing sufficient gas exhaustion without provision of the vent holes in the mold members.

The seal means may be comprised of a seal member for air-tightly sealing a fixed portion between the outer ring and the lower plate and/or the lower side mold member and the actuator means, respectively, and a seal member for air-tightly sealing a sliding portion between a seal plate and the outer ring and/or the actuator means and the lower plate.

In this case, it is preferred that, prior to full closure of the sector mold members, the seal member between the seal plate and the outer ring and the seal member between the actuator means and the lower plate are arranged at positions where those seal members exhibit their intended sealing function. Such arrangement ensures that an air-tight space can be formed inside prior to full formation of the mold cavity, and suction and removal of gas can be started before formation of the cavity, such that the gas within the cavity can be fully exhausted to more advantageously prevent occurrence of bears or the like to product tires.

Also, when the seal member between the outer ring and the lower plate and the actuator means as well as the seal member between the lower side mold member and the lower plate are arranged close to the center axis of the cavity, the capacity of the air-tight space formed under the action of the seal member can be further reduced to improve gas exhaustion efficiency.

Moreover, when a rod of the actuator means extends through the lower plate and the seal means is arranged between the rod and the lower plate, the air-tightness of the cavity can be further improved. Such advantage becomes more marked when the seal members are arranged between the upper plate, the seal plate and the upper side mold member, respectively.

BRIEF DESCRIPTION OF THE DRAWINGS

The present invention will be further described with reference to a preferred embodiment shown in the accompanying drawings.

BEST MODE FOR CARRYING OUT THE INVENTION

Figure 1:
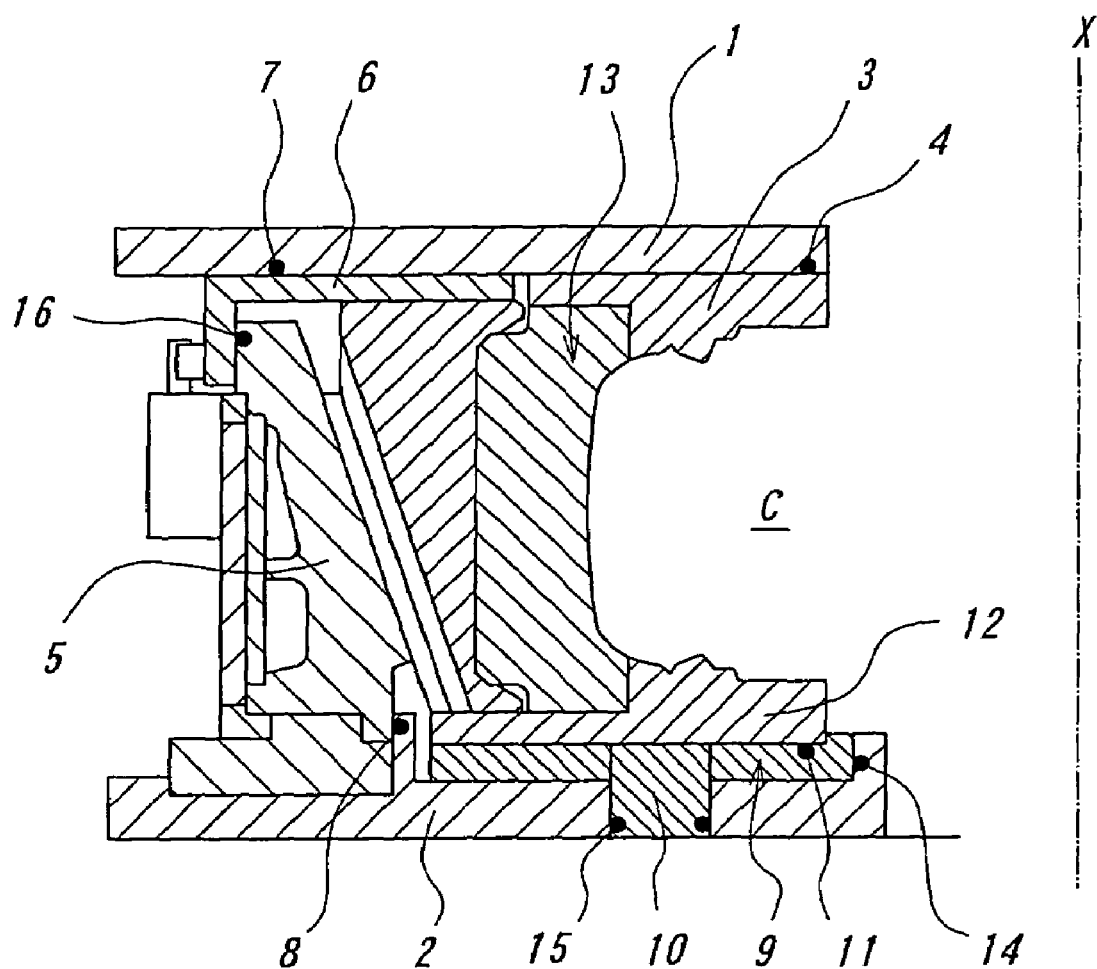
FIG. 1 is a longitudinal sectional view in showing a half of the vulcanizing device according to one embodiment of the present invention.

In FIG. 1, reference numerals 1, 2 represent an upper plate and a lower plate, respectively, in horizontal attitude, which are arranged opposite to each other so as to be relatively displaceable toward and away from each other. On the upper plate 1, an upper side mold member 3 for forming a side wall of a tire is fixedly secured via a seal member 4, and a seal plate 6 is fixedly secured via a seal member 7 so as to surround an outer ring 5 in sliding contact with its circumferential surface, as will be described below.

On the lower plate 2, the outer ring 5 is fixedly secured to project toward the upper plate 1 so as to be brought into sliding contact with the inner surface of the seal plate 6 slightly prior to full closure of the mold, for example. A seal member 8, which preferably is arranged sufficiently close to the center axis X of the device, seals the clearance between the outer ring 5 and the lower plate 2. Here, the outer ring 5 is of a conical shape having a thickness that is gradually decreased upwards, and forming a cam surface with its inner circumferential surface facing diagonally upward.

Also, on the lower plate 2, at a location on the inner circumferential side from the outer ring 5, there is arranged an actuator means 9 that is vertically displaceable relative to the upper plate 2. The actuator means 9 includes an annular supporting body and a rod 10 projecting downward from the supporting body. For example, the rod 10 may be constituted by a piston rod of a fluid cylinder device (not shown). The rod 10 is made capable of achieving sliding contact with the peripheral wall of a through hole provided in the lower plate 2, when it is displaced in the vertical direction.

On the actuator means 9, a lower side mold member 12 is fixedly secured via a seal member 11 that is arranged also close to the center axis X, and sector mold members 13 are arranged such that they can be radially expanded or contracted. The sector mold members 13 are each provided with a driven surface that is brought into sliding contact with the inner circumferential cam surface of the outer ring 5. As a result, when relative vertical displacement is generated between the sector mold members 13 and the outer ring 5, the sector mold members 13 can be displaced in the radial direction, and such displacement can be guided by the outer ring 5.

In the embodiment shown in FIG. 1, a seal member 14 is arranged at a position close to a sliding contact surface, more preferably, close the center axis X, upon vertical displacement of the actuator means 9 relative to the lower plate 2, and a seal member 15 is also arranged between the rod 10 of the actuator means 9 and the peripheral wall of the through hole in the lower plate 2. Furthermore, a seal member 16 is arranged between contact surfaces of the seal plate 6 fixedly secured to the upper plate 1, and the outer ring 5.

Figure 2A:
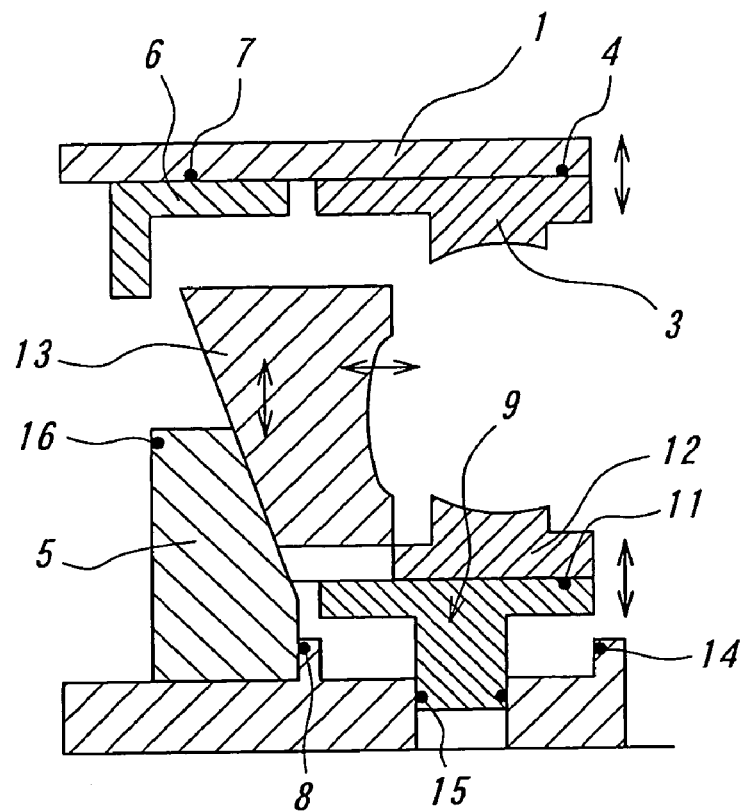
FIGS. 2a and 2b are schematic views showing the opening/closing operation of the mold in the device shown in FIG. 1.

In the open state of the vulcanizing device having the above constitution, when the upper plate 1 is lifted as shown in FIG. 2a, the actuator means 9 is also raised and displaced so as to form a sufficient space between the upper and the lower side mold members 8 and 12, and the sector mold members 13 to be engaged with the outer ring 5 are raised by the actuator means 9 to accomplish the enlarged diameter attitude displaced radially outward under the action of the cam surface of the outer ring.

Figure 2B:
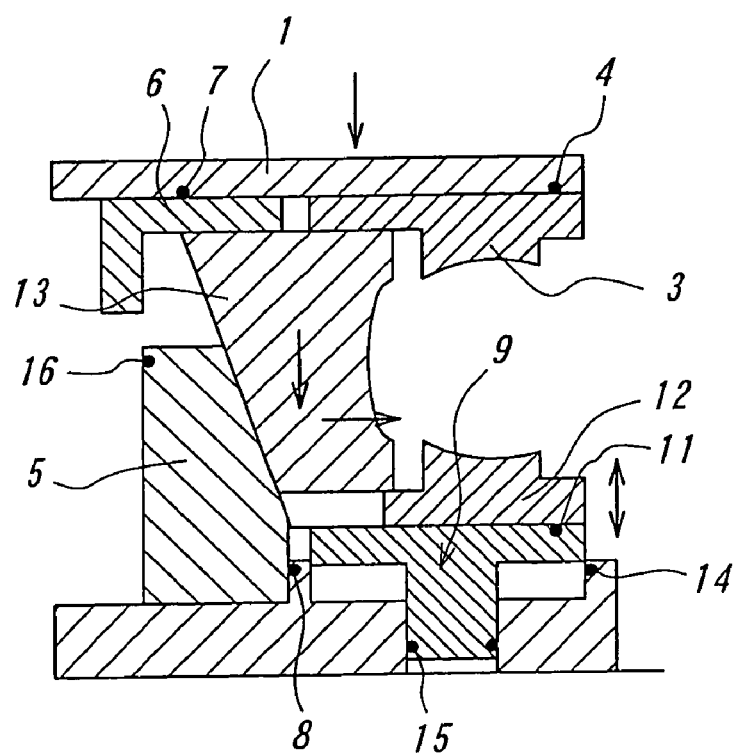

Moreover, in order to close the vulcanizing device in such an open attitude, as shown in FIG. 2b, the upper plate 1 is lowered and displaced together with the upper side plate 3 and the sector mold members 13 are pressed by the seal plate 6, by which the sector mold member 13 is lowered together with the actuator means 9 so as to generate diameter-reducing displacement of the sector mold members 13 under the action of the fixed outer ring 5. Such displacement state is continued until the sector mold members 13 reach the diameter-reducing limit position and the actuator means 9 to the lower limit position, respectively, so that the mold members 2, 12, 13 define the desired vulcanization mold cavity C.

In this way, according to the present invention, since the mold can be opened/closed without requiring operation of heavy outer ring 5, the structure of the vulcanizing machine can be simplified and the size of the entire vulcanizing machine can be sufficiently reduced. Moreover, in the fully closed state of the vulcanizing device as shown in FIG. 1, the inner space of the vulcanization mold cavity C can be kept in air-tight manner under the action of the seal members 4, 7, 8, 11, 14, 15, 16. Thus, gas within the cavity C can be smoothly, rapidly and sufficiently exhausted by sucking and removing the gas, without forming vent holes.

Such advantage is particularly remarkable if the seal members 14, 15, 16 arranged between the respective sliding surfaces are arranged at positions where they can exhibit the intended sealing function before the full closure of the mold, thereby allowing suction and removal of the trapped air or the like to be started as soon as these seal members 14, 15, 16 exhibit their functions, that is, prior to formation of the cavity C.

Figure 3:
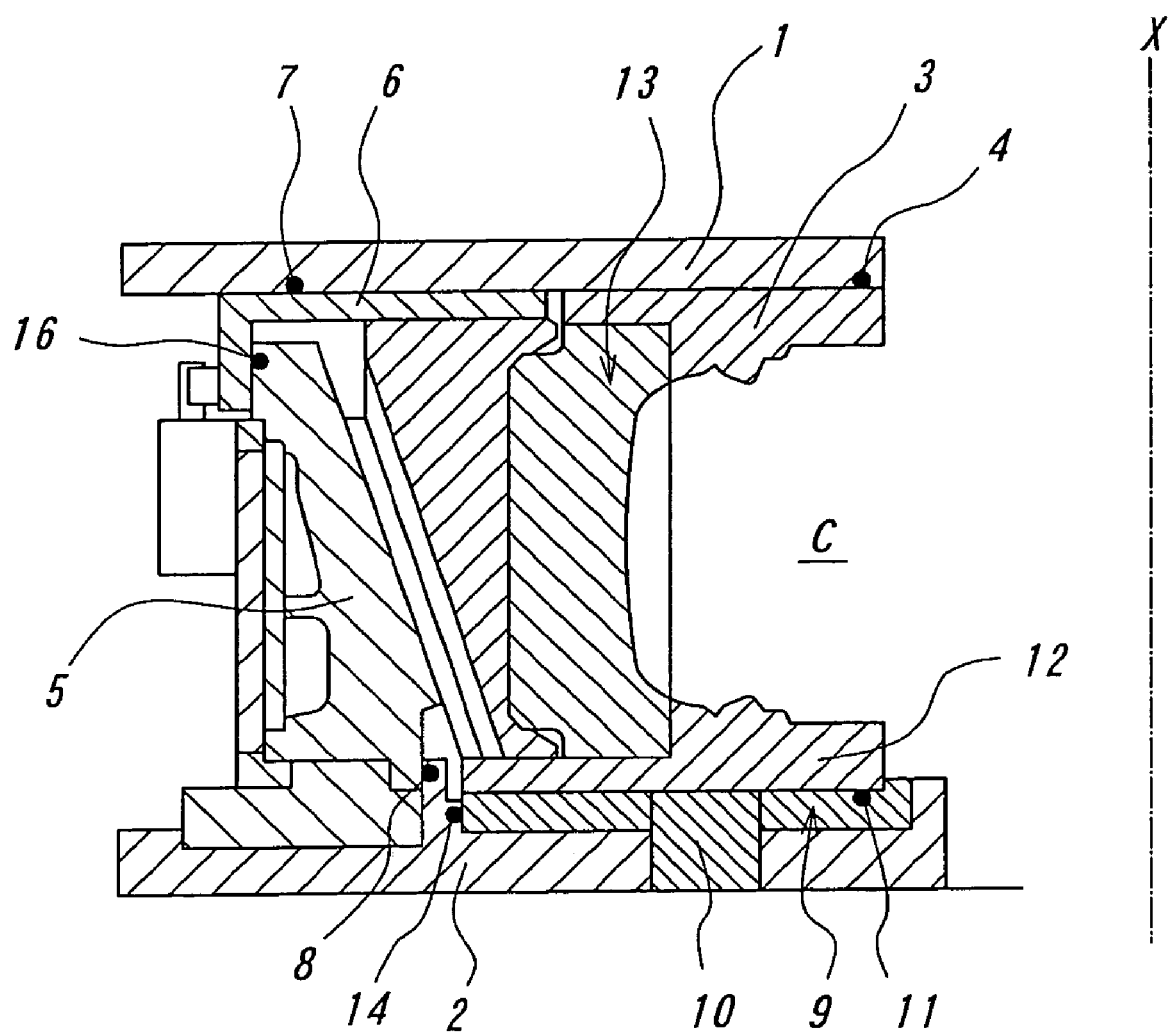
FIG. 3 is a sectional view similar to FIG. 1, exemplarily showing another arrangement of the seal member.

FIG. 3 is a view showing another example of the arrangement of the seal means wherein, in particular, the seal member 14 between the actuator means 9 and the lower plate 2 is arranged on the outer circumferential side of the actuator means 9, while the seal member between the rod 10 of the actuator means 9 and the peripheral wall of the through hole in the lower plate 2 is omitted. With such arrangement and structure of the seal means, similar functions as the previous embodiment can be achieved, and suction and removal of trapped air and generated gas can be performed from before to after formation of the cavity C.

It will be appreciated from the foregoing description that, according to the present invention, since the mold can be opened/closed without operating heavy outer ring, it is possible to simplify the structure of the vulcanizing machine to which the vulcanizing device is attached, to reduce the size of the vulcanizing machine, and to achieve energy savings can be achieved. Moreover, by allowing suction and removal of the trapped air or generated gas in the vulcanization mold cavity under the action of the seal means, it is possible to eliminate requirement for vent hole in the mold member, completely without the risk of occurrence of bears or the like defects in the product tire.

The present invention has been explained above with reference to the illustrated preferred embodiment, though it is needless to say that the present invention can be embodied with various modifications without deviating from the scope of the invention.

The invention claimed is:

1. A tire vulcanizing device comprising an upper plate and a lower plate which can be relatively displaced toward and away from each other, and a mold for vulcanizing and molding a tire, arranged between the upper plate and the lower plate, said mold comprising an upper and a lower side mold members arranged on an upper plate side and a lower plate side, respectively, and a plurality of sector mold members arranged between the upper and the lower side mold members,
   wherein an outer ring for positioning the sector mold members in the radial direction is arranged on the lower plate side,
   an actuator means for opening the sector mold members is arranged on the lower plate, so as to be displaceable vertically, and
   a seal means is provided for sealing a cavity in an air-tight manner, said cavity being defined by the upper and the lower side mold members and the plurality of sector mold members in a closed state of the mold, the seal means comprising a seal member arranged between the actuator means and the lower plate.

2. A tire vulcanizing device according to claim 1, wherein the actuator means is capable of upward displacement from the lower plate.

3. A tire vulcanizing device according to claim 1, wherein the lower side mold member is supported on the actuator means.

4. A tire vulcanizing device according to claim 1, wherein the sector mold members are supported on the actuator means, before they are opened.

5. A tire vulcanizing device according to claim 1, wherein a seal plate surrounding the outer ring and in sliding contact therewith is provided on the upper plate, the lower side mold member is supported on the actuator means, and the seal means further comprises a second seal member arranged between the seal plate and the outer ring.

6. A tire vulcanizing device according to claim 1, wherein the seal means is arranged at a position where a seal function can be exerted prior to closure of the sector mold members.

7. A tire vulcanizing device according to claim 1, wherein a seal plate surrounding the outer ring and in sliding contact therewith is provided on the upper plate, the lower side mold member is supported on the actuator means, and the seal means further comprises a second seal member arranged between the outer ring and the lower plate and/or between the lower side mold member and the actuator means.

8. A tire vulcanizing device according to claim 1, wherein the actuator means comprises a rod extending through the lower plate, and the seal means further comprises a second seal member arranged between the rod and the lower plate.

9. A tire vulcanizing device according to claim 1, wherein the seal means further comprises a second seal member arranged between the upper plate and a seal plate and/or the upper side mold member.

* * * * *